United States Patent
Wu et al.

(10) Patent No.: US 11,711,029 B2
(45) Date of Patent: Jul. 25, 2023

(54) METHOD OF CONTROLLING POWER CONVERTER AND POWER CONVERTER

(71) Applicant: DELTA ELECTRONICS, INC., Taoyuan (TW)

(72) Inventors: Ping-Heng Wu, Taoyuan (TW); Kai-Wei Hu, Taoyuan (TW); Lei-Chung Hsing, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/687,076

(22) Filed: Mar. 4, 2022

(65) Prior Publication Data
US 2023/0132524 A1 May 4, 2023

(51) Int. Cl.
*H02M 7/5395* (2006.01)
*H02M 1/08* (2006.01)
*H02M 1/14* (2006.01)

(52) U.S. Cl.
CPC ......... *H02M 7/5395* (2013.01); *H02M 1/083* (2013.01); *H02M 1/14* (2013.01)

(58) Field of Classification Search
CPC ....... H02M 1/083; H02M 7/5395; H02M 1/14
See application file for complete search history.

(56) References Cited

U.S. PATENT DOCUMENTS 4,723,201 A * 2/1988 Tanamachi ............. H02P 27/08
318/811
4,763,060 A * 8/1988 Takahashi ......... H02M 7/53873
318/803
5,053,690 A * 10/1991 Mutoh .............. H02M 7/53873
318/803

(Continued)

FOREIGN PATENT DOCUMENTS

CN       101971475 A    2/2011
TW       202019070 A    5/2020

OTHER PUBLICATIONS

Nayeemuddin et al., "Experimental Validation of Common Mode Voltage Reduction PWM Algorithms in VSI fed AC Drive," International Journal of Scientific Research and Review, vol. 7, Issue 1, 2018, 9 pages.

*Primary Examiner* — Yusef A Ahmed
(74) *Attorney, Agent, or Firm* — Muncy, Geissler, Olds & Lowe, P.C.

(57) ABSTRACT

A method of controlling a power converter is provided. The power converter generates a three-phase output power by switching an input power through a plurality of switches. The method includes steps of: acquiring a three-phase output command corresponding to the three-phase output power; comparing the three-phase output command with a control carrier to acquire a voltage phase angle corresponding to the three-phase output command; acquiring a three-phase current value of the three-phase output power; detecting the voltage phase angle and a positive/negative change of the three-phase current value to decide a zero-sequence voltage; composing the zero-sequence voltage and the three-phase output command to acquire a three-phase output expected value; comparing the three-phase expected values with the control carrier to acquire a turned-on time of each switch; and switching the input power to adjust the three-phase output power according to the turned-on time of each switch.

15 Claims, 13 Drawing Sheets

(56) References Cited

U.S. PATENT DOCUMENTS

| | | | | | |
|---|---|---|---|---|---|
| 5,309,349 | A | * | 5/1994 | Kwan | G01R 19/0092 363/78 |
| 5,552,977 | A | * | 9/1996 | Xu | H02M 7/53875 318/811 |
| 5,671,130 | A | * | 9/1997 | Kerkman | H02M 7/53875 318/811 |
| 5,736,825 | A | * | 4/1998 | Kaura | G05B 11/28 318/599 |
| 5,917,721 | A | * | 6/1999 | Kerkman | H02M 7/53875 363/41 |
| 6,023,417 | A | * | 2/2000 | Hava | H02M 7/53875 318/811 |
| 6,088,246 | A | * | 7/2000 | Okuyama | H02M 7/53873 363/41 |
| 6,137,704 | A | * | 10/2000 | Ito | H02M 5/458 363/132 |
| 8,963,479 | B2 | * | 2/2015 | Suzuki | H02P 27/085 318/599 |
| 10,498,216 | B1 | * | 12/2019 | Lee | H02M 1/08 |
| 2001/0015904 | A1 | * | 8/2001 | Kimura | H02M 7/538 363/131 |
| 2004/0169488 | A1 | * | 9/2004 | Maeda | H02P 27/06 318/801 |
| 2006/0113948 | A1 | * | 6/2006 | Kaneko | H02P 21/18 318/716 |
| 2007/0103950 | A1 | * | 5/2007 | Arisawa | H02M 7/53875 363/132 |
| 2008/0252250 | A1 | * | 10/2008 | Hida | H02P 25/00 318/801 |
| 2010/0039056 | A1 | * | 2/2010 | Kobayashi | H02M 7/48 318/400.35 |
| 2011/0050140 | A1 | * | 3/2011 | Sakai | H02M 7/53873 318/400.36 |
| 2011/0134669 | A1 | * | 6/2011 | Yuzurihara | H02M 7/219 363/89 |
| 2012/0206945 | A1 | * | 8/2012 | Brogan | H02M 7/5395 363/40 |
| 2012/0212191 | A1 | * | 8/2012 | Yuzurihara | H02M 3/1584 323/205 |
| 2013/0088181 | A1 | * | 4/2013 | Hirose | H02P 6/00 318/503 |
| 2015/0069941 | A1 | * | 3/2015 | Iwaji | H02P 6/18 318/400.11 |
| 2015/0131351 | A1 | * | 5/2015 | Hart | H02M 7/537 363/131 |
| 2015/0222185 | A1 | | 8/2015 | King et al. | |
| 2015/0303826 | A1 | * | 10/2015 | Arnedo | H02M 7/537 363/97 |
| 2015/0311800 | A1 | * | 10/2015 | Katayama | H02M 7/5395 323/235 |
| 2016/0094140 | A1 | * | 3/2016 | Yamazaki | H02M 5/297 363/163 |
| 2016/0276945 | A1 | | 9/2016 | Yan et al. | |
| 2016/0322890 | A1 | * | 11/2016 | Lee | H02M 7/53871 |
| 2017/0201189 | A1 | * | 7/2017 | Li | H02S 40/32 |
| 2017/0214355 | A1 | * | 7/2017 | Yamakawa | H02P 27/08 |
| 2019/0013761 | A1 | * | 1/2019 | Seo | H02P 27/08 |
| 2019/0058418 | A1 | * | 2/2019 | Mori | G01R 31/40 |
| 2019/0214933 | A1 | * | 7/2019 | Saha | B60L 3/003 |
| 2019/0238063 | A1 | * | 8/2019 | Irie | H02M 7/539 |
| 2019/0238067 | A1 | * | 8/2019 | Kondo | H02M 7/539 |
| 2020/0007049 | A1 | * | 1/2020 | Kitano | H02M 1/126 |
| 2020/0153375 | A1 | * | 5/2020 | Mori | H02M 7/5395 |
| 2021/0083598 | A1 | * | 3/2021 | Södö | H02M 7/219 |
| 2021/0281205 | A1 | * | 9/2021 | Takagi | H02P 21/141 |
| 2022/0103110 | A1 | * | 3/2022 | Mori | H02M 1/0025 |
| 2022/0200436 | A1 | * | 6/2022 | Hart | H02M 7/53876 |

* cited by examiner

METHOD OF CONTROLLING POWER CONVERTER AND POWER CONVERTER

BACKGROUND

Technical Field

The present disclosure relates to a method of controlling power converter and a power converter, and more particularly to a method of controlling power converter and a power converter that are based on an Active Zero-State Space Vector Pulse-Width Modulation (AZSVPWM) by using proper intervals to introduce zero-sequence voltage to reduce DC current ripple.

Description of Related Art

The statements in this section merely provide background information related to the present disclosure and do not necessarily constitute prior art.

In various industrial applications, a power converter 100 shown in FIG. 1 is often used to convert electrical energy. The power converter 100 disposed between on the AC side and the DC side is used to convert the electrical energy of the battery 200 and provides the required power to the load 300. In particular, the place where the power converter 100 is connected to the battery 200 may be referred to as the "DC side", which may be batteries, solar panels, capacitors, etc. in different practical applications. The load side in FIG. 1 may also be referred to as the "AC side", which can be motors, power grids, industrial products, etc. in different practical applications.

Please refer to FIG. 2, which shows a circuit diagram of the conventional power converter. The power converter 100 is composed of a three-arm structure including six switches (each arm includes an upper arm switch $S_{u1}$, $S_{v1}$, $S_{w1}$ and a lower arm switch $S_{u2}$, $S_{v2}$, $S_{w2}$). The output of each phase is connected to a center point of the upper arm switch and the corresponding lower arm switch, which is a known circuit structure widely used in industrial products.

Please refer to FIG. 3, which shows a block diagram of the system structure of pulse width modulation traditionally applied to the power converter. In different practical applications, the controller 400 corresponding to the power converter 100 is designed in different manners. For example, when the load 300 is a voltage source, the power converter 100 is often used as an active front end, and therefore the controller 400 should adjust the power factor of the AC side. If the load 300 is a motor, the power converter 100 should be designed to control various types of motors. Therefore, with different applications, the design of the controller 400 corresponding to the power converter 100 is also different, but the purpose is to control the voltage on the AC side to achieve the purpose of control. Therefore, the controller 400 generates a corresponding voltage command Vref to control the output voltage of the AC side. Moreover, the pulse width modulation (PWM) technology 500 can convert (modulate) the voltage command Vref to output a switching signal to a switching element module of the power converter 100 to output the corresponding voltage. As shown in FIG. 3, the output voltage of the power converter 100 is a pulse voltage. Ideally, if there is no loss in the system, the average value of the pulse voltage will be the voltage command Vref.

Most of the pulse width modulation technology used in traditional three-phase power converters is a switching method called space vector pulse width modulation (SVPWM), which is to compare the voltage command of each of the three phases with a carrier ePWM. As shown in FIG. 4, when the phase voltage command Vref is greater than the carrier ePWM, the upper-arm switch is turned on, and the lower-arm switch is turned off. As shown in FIG. 5, if the three-phase voltage commands $v_u^*$, $v_v^*$, $v_w^*$ are compared with the carrier ePWM, the switches of the three-phase arms can be sorted out as shown in FIG. 5 (when $v_u^*>v_v^*>v_w^*$).

By analyzing various combinations of voltage commands and transfer output voltages to the d-q synchronization axis, which can be sorted into a space vector diagram composed of voltage vectors $v_0$-$v_7$, as shown in FIG. 6. For example, $v_1(100)$ represents the U-phase upper arm switch is turned on, the V-phase and W-phase lower arm switches are turned on, and the output voltages generated by $v_0(000)$ and $v_7(111)$ are all zero, so it is called the zero vector, and the remaining $v_1$-$v_6$ vectors are called active vectors. This PWM method has been widely used in various power converter products.

FIG. 6 can explain the basic concept of SVPWM: the three-phase voltage commands $v_u^*$, $v_v^*$, $v_w^*$ are transferred to the synchronization axis and then the angle θ between the voltage command v* and the q axis is acquired. The different angles θ make the voltage command v* fall within any vector triangle in FIG. 6. This voltage command will be synthesized by the voltage vectors forming the triangle within one switching cycle. The voltage command v* falls in the triangular interval composed of $v_1$, $v_2$, $v_0$, $v_7$. In this condition, in a PWM switching cycle, as shown in FIG. 5, the output voltage vector is $v_7$-$v_2$-$v_1$-$v_0$-$v_1$-$v_2$-$v_7$ in sequence, and Table 1 defines the relationship between the voltage intervals and the angle θ of voltage command v*.

TABLE 1

| voltage intervals ($R_{vol}$) | angle (θ) of voltage command v* |
| --- | --- |
| I | 0°-60° |
| II | 60°-120° |
| III | 120°-180° |
| IV | 180°-240° |
| V | 240°-300° |
| VI | 300°-360° |

Different from the aforementioned SVPWM, there is another PWM switching method called AZSVPWM, the principle of which is to replace the zero vectors ($v_0$, $v_7$) in a switching cycle with the active vectors ($v_1$-$v_6$), as shown in FIG. 7 (when $v_u^*>v_v^*>v_w^*$). Unlike SVPWM, the switching method of AZSVPWM is to compare the maximum ($v_u^*$) and minimum ($v_w^*$) of the three-phase voltage command with a carrier ePWM, and the intermediate value ($v_v^*$) with a reverse carrier ePWM'. Compared with FIG. 5, it can be found that the zero vector in SVPWM is replaced by the active vector ($v_3$, $v_6$), that is, the zero vector $v_7$ is replaced by the active vector $v_6$, and the zero vector $v_0$ is replaced by the active vector $v_3$. Therefore, corresponding to the vector diagram of FIG. 6, the voltage command v* is composed of the vector falling on the half plane. This switching method can effectively reduce the common-mode voltage on the output side, and is often used in motor driver applications, and this method has been widely discussed in academics and the industry. On this basis, the technology proposed in the present disclosure is more commonly used in motor driver applications. It is a technology based on AZSVPWM that uses an appropriate interval to introduce zero-sequence voltage to reduce DC current ripple.

SUMMARY

An object of the present disclosure is to provide a method of controlling a power converter to solve the problems of the existing technology.

In order to achieve the above-mentioned object, the power converter converts an input power to generate a three-phase output power through a plurality of switches. The method includes steps of: acquiring a three-phase output commands corresponding to the three-phase output power; comparing the three-phase output command with a control carrier to acquire a voltage phase angle corresponding to the three-phase output command according to the comparison result; acquiring a three-phase current value of the three-phase output power; detecting the voltage phase angle and a positive/negative change of the three-phase current value to decide that a zero-sequence voltage is a positive voltage, a zero voltage, or a negative voltage; composing the zero-sequence voltage and the three-phase output command to acquire a three-phase output expected value; comparing the three-phase expected value with the control carrier to acquire a turned-on time of each switch; switching the input power to adjust the three-phase output power according to the turned-on time of each switch.

In one embodiment, the method further includes steps of: building a table by a controller; determining the voltage phase angle and the positive/negative change of the three-phase current value to query the table to decide that the zero-sequence voltage is the positive voltage, the zero voltage, or the negative voltage. The table includes a plurality of voltage intervals and a plurality of current intervals, and each voltage interval is corresponding to the plurality of current intervals. Each voltage interval of the table correspondingly records a plurality of phase intervals. Each current interval of the table records the positive/negative change of the three-phase current value. The table records the zero-sequence voltage corresponding to each current interval in the different voltage intervals is the positive voltage, the zero voltage, or the negative voltage.

In one embodiment, the method further includes steps of: determining that the voltage phase angle falls into one of the plurality of phase intervals; selecting correspondingly the voltage interval corresponding to one of the plurality of phase intervals in the table; receiving and determining the positive/negative change of the three-phase current value, and selecting the corresponding current interval in the table; querying the table to decide that the zero-sequence voltage is the positive voltage, the zero voltage, or the negative voltage according to the selected voltage interval and the selected current interval.

In one embodiment, the plurality of phase intervals includes a first phase interval [0, π/3], a second phase interval [π/3, 2π/3], a third phase interval [2π/3, π], a fourth phase interval [π, 4π/3], a fifth phase interval [4π/3, 5π/3], and a sixth phase interval [5π/3, 2π].

In one embodiment, the method further includes steps of: recording the three-phase current value as a first current interval of the plurality of current intervals when a U-phase current of the three-phase current value is positive, a V-phase current is negative, and a W-phase current is negative; recording the three-phase current value as a second current interval of the plurality of current intervals when the U-phase current of the three-phase current value is positive, the V-phase current is positive, and the W-phase current is negative; recording the three-phase current value as a third current interval of the plurality of current intervals when the U-phase current of the three-phase current value is negative, the V-phase current is positive, and the W-phase current is negative; recording the three-phase current value as a fourth current interval of the plurality of current intervals when the U-phase current of the three-phase current value is negative, the V-phase current is positive, and the W-phase current is positive; recording the three-phase current value as a fifth current interval of the plurality of current intervals when the U-phase current of the three-phase current value is negative, the V-phase current is negative, and the W-phase current is positive; recording the three-phase current value as a sixth current interval of the plurality of current intervals when the U-phase current of the three-phase current value is positive, the V-phase current is negative, and the W-phase current is positive.

In one embodiment, when the zero-sequence voltage is decided to be the positive voltage, the method further includes steps of: acquiring a peak value of the control carrier in a switching cycle; acquiring a maximum voltage command of the three-phase output command; calculating a first voltage difference between the peak value and the maximum voltage command as a magnitude of the positive voltage of the zero-sequence voltage.

In one embodiment, when the zero-sequence voltage is decided to be the negative voltage, the method further includes steps of: acquiring a valley value of the control carrier in a switching cycle; acquiring a minimum voltage command of the three-phase output command; calculating a second voltage difference between the valley value and the minimum voltage command as a magnitude of the negative voltage of the zero-sequence voltage.

In one embodiment, the control carrier incudes a first triangle wave and a second triangle wave, and a phase difference between the first triangle wave and the second triangle wave is π.

In one embodiment, the method further includes a step of: executing an AZSVPWM control to acquire the voltage phase angle corresponding to the three-phase output command located on a two-phase coordinate axis according to the three-phase output command, the first triangle wave, and the second triangle wave.

In one embodiment, the power converter includes a DC-side capacitor, and the DC-side capacitor is coupled to each of the switches, and the method further includes a step of: acquiring the turned-on time of each switch by comparing the three-phase output expected value with the control carrier to reduce a current ripple of the DC-side capacitor.

Accordingly, the method of controlling the power converter proposed by the present disclosure is based on the AZSVPWM, and the appropriate zero-sequence voltage is introduced to reduce DC current ripple.

Another object of the present disclosure is to provide a power converter to solve the problems of the existing technology.

In order to achieve the above-mentioned object, the power converter includes a plurality of switches and a controller. The plurality of switches converts an input power to generate a three-phase output power. The controller includes a control carrier, wherein the controller acquires a three-phase output command corresponding to the three-phase output power, and acquires a voltage phase angle corresponding to the three-phase output command. The controller detects a positive/negative change of a three-phase current value of the three-phase output power. The controller builds a table, and the table incudes a plurality of voltage intervals and a plurality of current intervals, and each voltage interval is corresponding to the plurality of current intervals. Each voltage interval of the table correspondingly records a plurality of phase intervals. Each current interval of the table records the positive/negative change of the three-phase current value. The table records the zero-sequence voltage corresponding to each current interval in the different voltage intervals is the positive voltage, the zero voltage, or the negative voltage. The controller queries the table to determine the voltage interval in which the voltage phase angle falls according to the voltage phase angle and the three-phase current value, and decides that the zero-sequence voltage is the positive voltage, the zero voltage, or the negative voltage according to the current interval corresponding to the positive/negative change of the three-phase current value. The controller composes the zero-sequence voltage and the three-phase output command to acquire a three-phase output expected value, and compares the three-phase expected value with the control carrier to acquire a turned-on time of each switch.

Accordingly, the power converter proposed by the present disclosure is based on the AZSVPWM, and the appropriate zero-sequence voltage is introduced to reduce DC current ripple.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
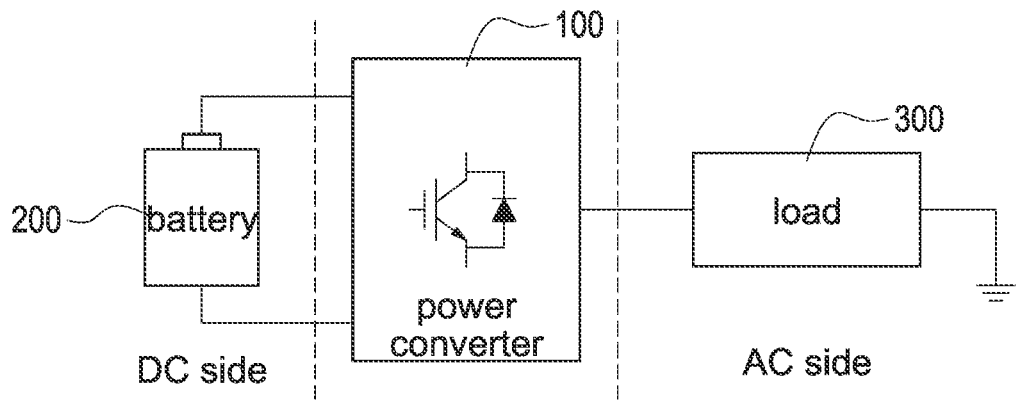
FIG. 1 is a schematic block diagram of a conventional power converter in application.

Reference will now be made to the drawing figures to describe the present disclosure in detail. It will be understood that the drawing figures and exemplified embodiments of present disclosure are not limited to the details thereof.

As mentioned above, the power converter is used to convert electrical energy between the DC side and the AC side in various applications. The power converter is composed of a power switch module, which achieves electrical energy conversion by switching a plurality of switches. As shown in FIG. 1, for example, the input power output from the battery 200 shown in FIG. 1 is converted into the three-phase output power. The technology proposed in the present disclosure is a switching technology applied to a traditional three-phase power converter. In other embodiments, the input power may be direct current (DC), single-phase alternating current (AC), three-phase alternating current (AC), or multi-phase alternating current (AC), etc., but the present disclosure is not limited thereto.

Figure 2:
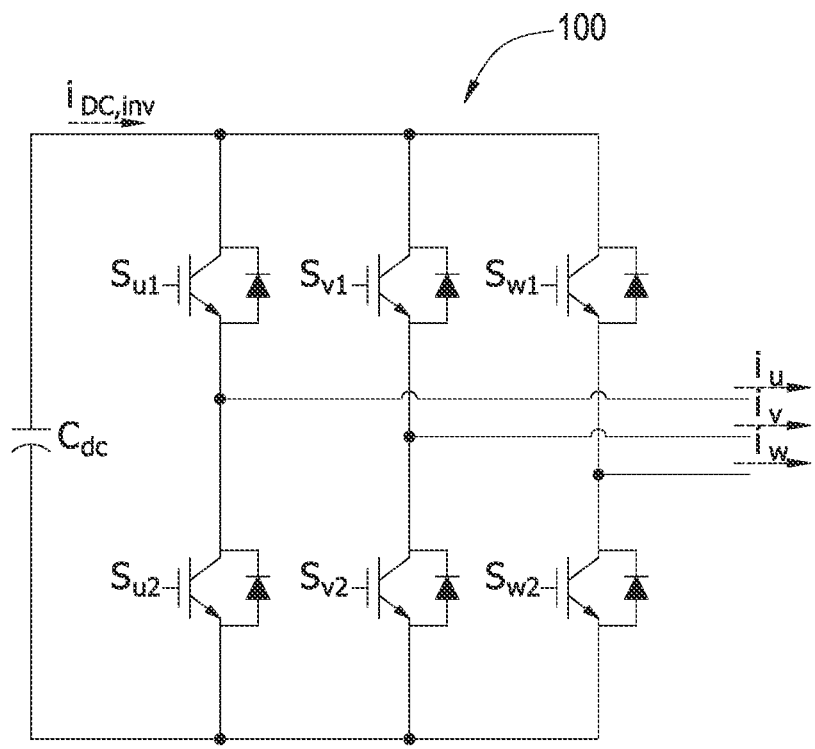
FIG. 2 is a circuit diagram of the conventional power converter.
Figure 3:
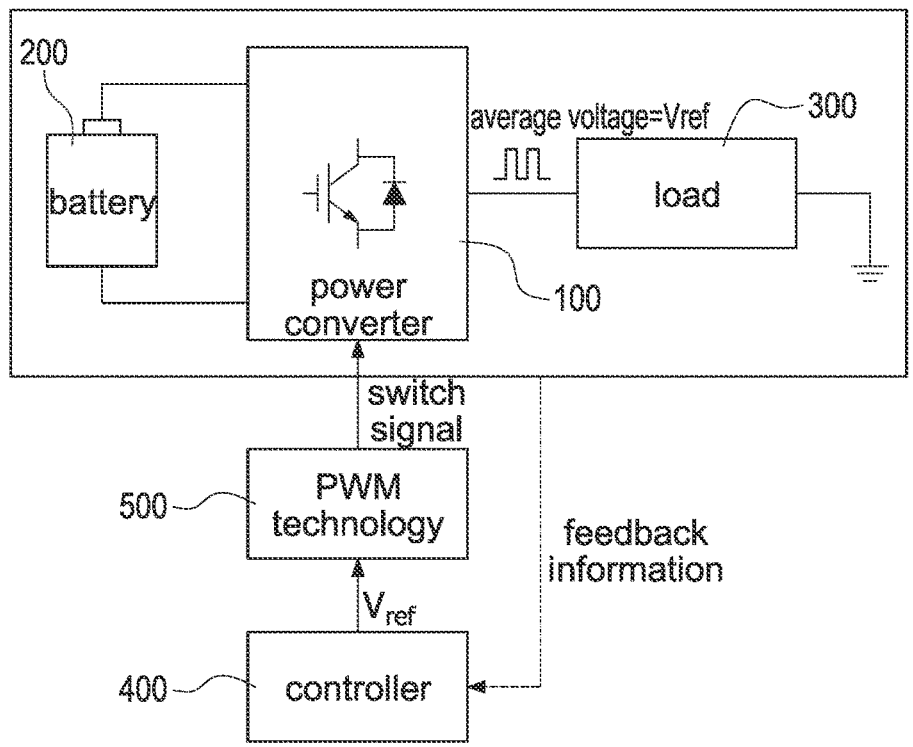
FIG. 3 is a block diagram of the system structure of pulse width modulation traditionally applied to the power converter.
Figure 4:
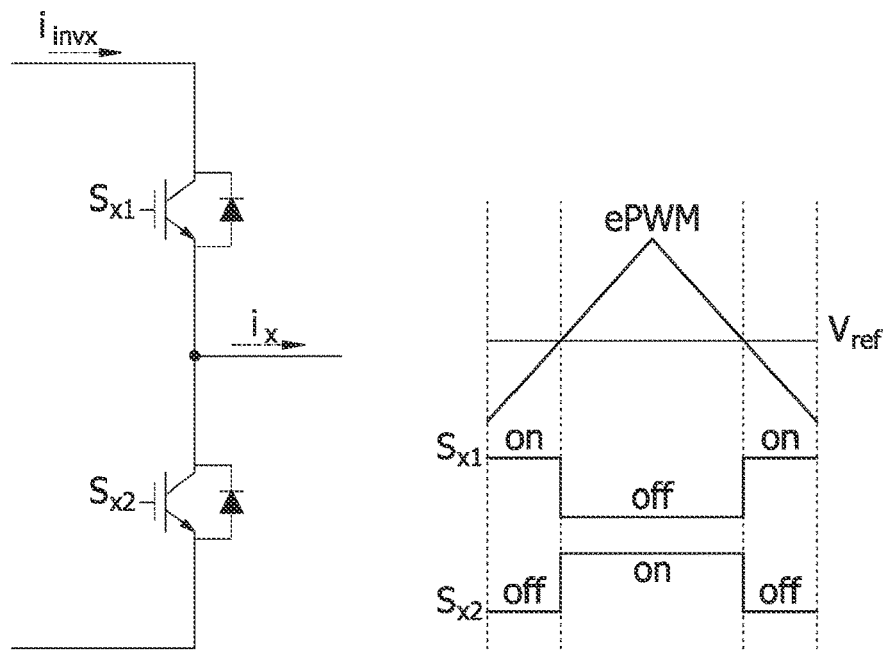
FIG. 4 is a schematic waveform of switching the conventional power converter in a PWM manner.
Figure 5:
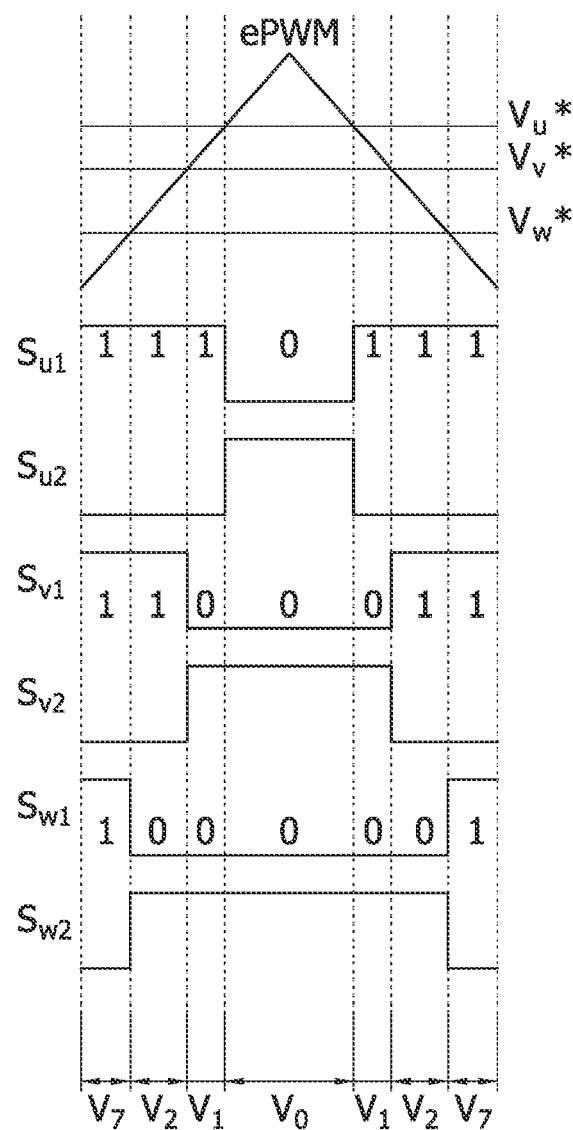
FIG. 5 is a schematic waveform of switching the conventional power converter in an SVPWM manner.

Please refer to FIG. 2, which shows a conventional power converter including a DC-side capacitor $C_{dc}$. A current $i_{DC,\ inv}$ flowing through the DC-side capacitor $C_{dc}$ (referred to as DC-side capacitor current $i_{DC,\ inv}$ later) is affected by the switching of the three-phase switches, and it is expressed in formula (1) as follows.

$$i_{DC,inv} = S_u \cdot i_u + S_v \cdot i_v + S_w \cdot i_w \quad (1)$$

In which, $S_u$, $S_v$, $S_w$ represent switching status of each arm. Take the U phase of FIG. 2 as an example, when the upper arm switch ($S_{u1}$) is turned on, $S_u=1$; conversely, when the lower arm switch ($S_{u2}$) is turned on, $S_u=0$. The effective value (root-mean-square value) of the DC-side capacitor current $i_{DC,\ inv,\ rms}$ is calculated as follows.

$$i_{DC,inv,rms} = 1/T_{sw} \int (i_{DC,inv})^2 dt \quad (2)$$

It is assumed that the voltage command falls in the triangle interval composed of $v_1, v_2, v_0, v_7$. According to the switching manner of the three arms and the corresponding output current, the relationship between the voltage vector and the DC-side capacitor current $i_{DC,\ inv}$ may be sorted as shown in Table 2.

TABLE 2

| voltage vectors | DC-side capacitor current $i_{DC,\ inv}$ |
| --- | --- |
| $v_1$ | $i_u$ |
| $v_2$ | $-i_w$ |
| $v_3$ | $i_v$ |
| $v_4$ | $-i_u$ |
| $v_5$ | $i_w$ |
| $v_6$ | $-i_v$ |
| $v_0, v_7$ | 0 |

Table 3 defines the current interval according to the polarity of the output current of the power converter (it is assumed that the three-phase current is balanced), and the maximum absolute value of the three-phase current in each current interval is $i_{max}$.

TABLE 3

| current intervals (Rcur) | $i_u$ | $i_v$ | $i_w$ | $i_{max}$ |
|---|---|---|---|---|
| I | >0 | <0 | <0 | $i_u$ |
| II | >0 | >0 | <0 | $i_w$ |
| III | <0 | >0 | <0 | $i_v$ |
| IV | <0 | >0 | >0 | $i_u$ |
| V | <0 | <0 | >0 | $i_w$ |
| VI | >0 | <0 | >0 | $i_v$ |

Figure 7:
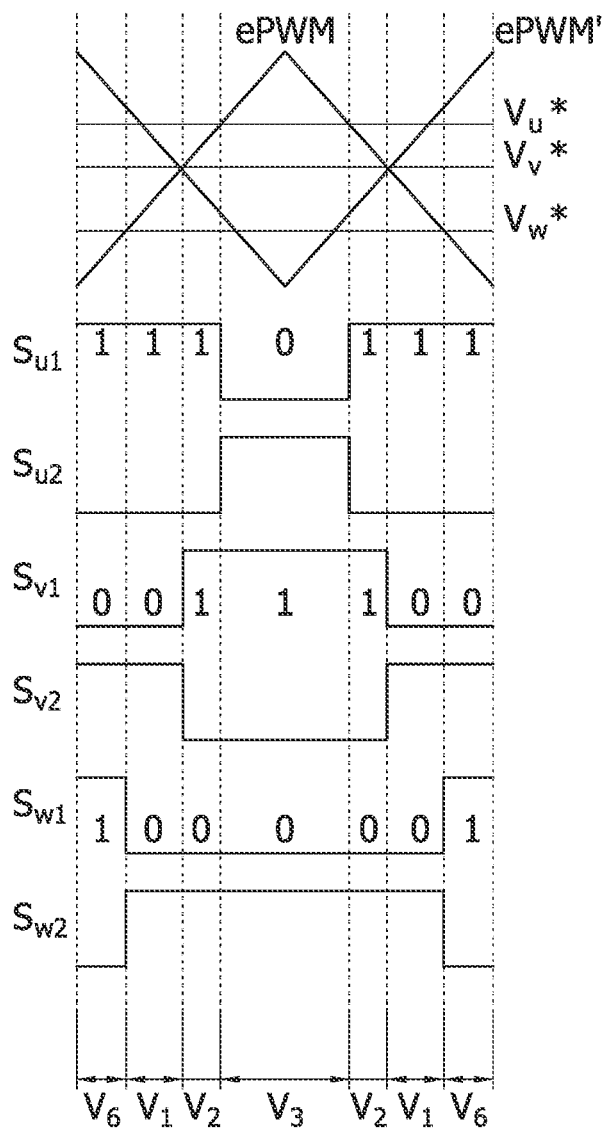
FIG. 7 is a schematic waveform of switching the power converter in an AZSVPWM manner.
Figure 8A:
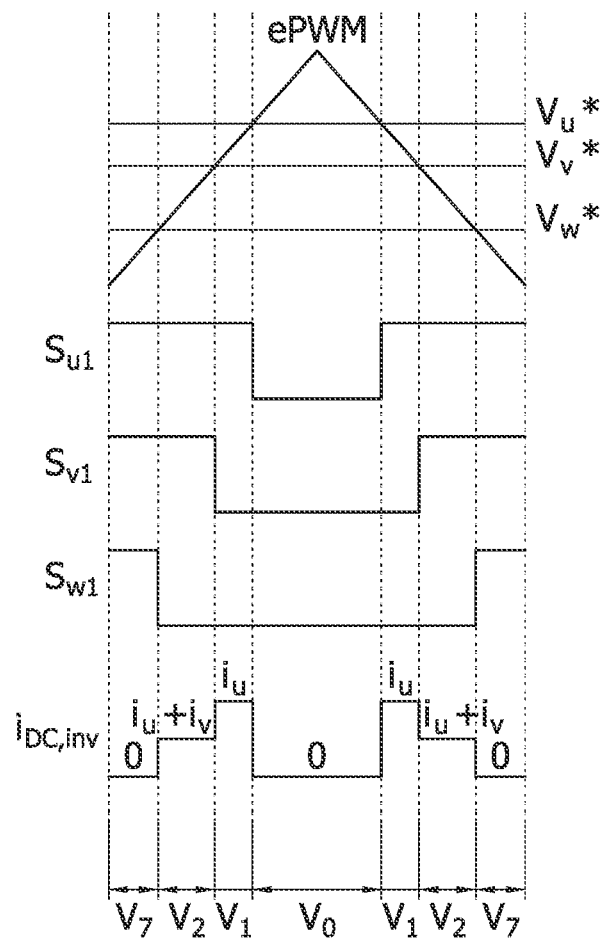
FIG. 8A is a schematic waveform of the relationship between switch switching and a DC current in a switching cycle under traditional SVPWM switching.
Figure 8B:
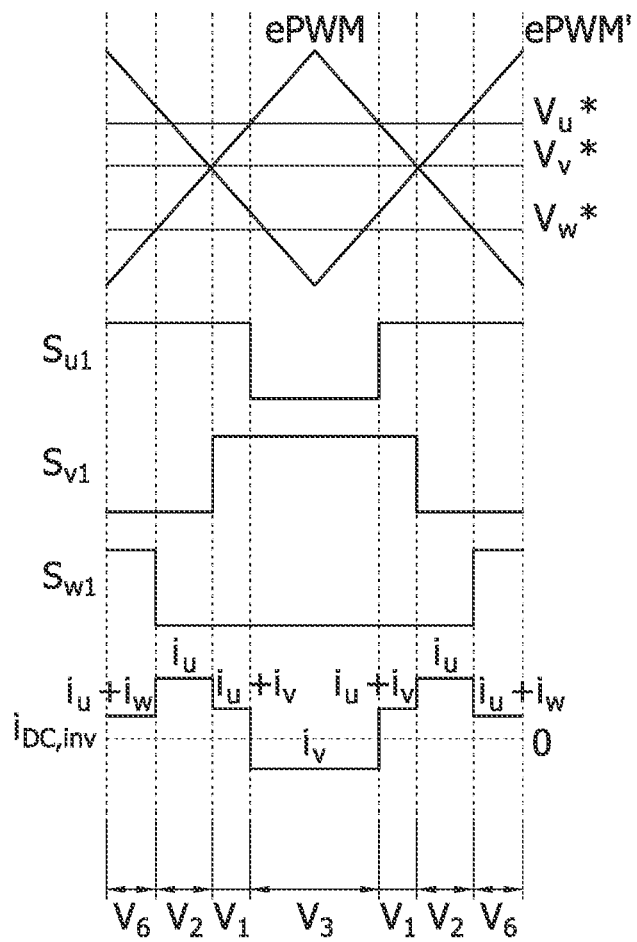
FIG. 8B is a schematic waveform of the relationship between switch switching and a DC current in a switching cycle under AZSVPWM switching according to the present disclosure.
Figure 13:
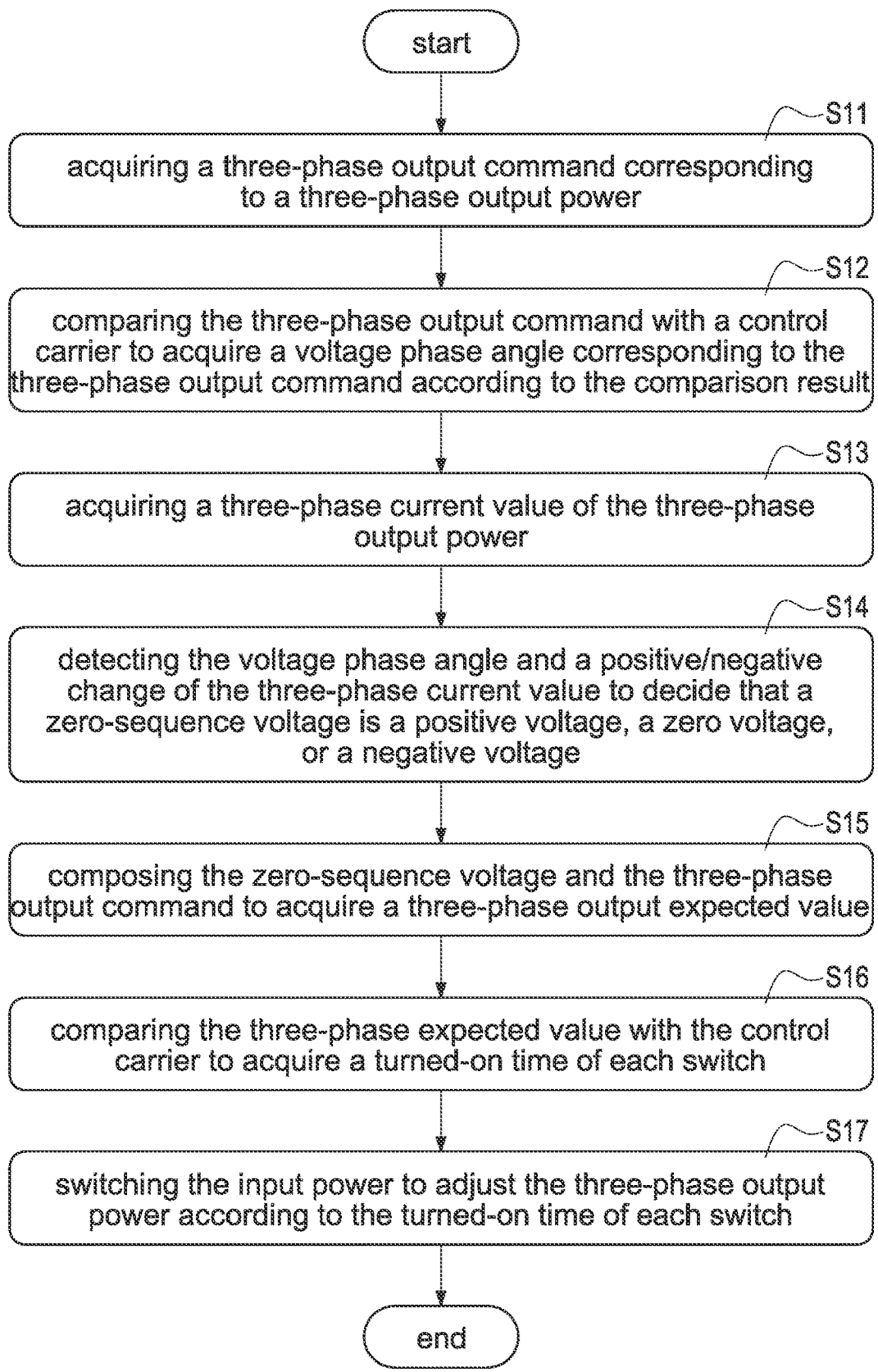
FIG. 13 is a flowchart of a method of controlling the power converter according to the present disclosure.

Please refer to FIG. 13, which shows a method of controlling the power converter according to the present disclosure, and also refer to FIG. 7 and FIG. 8B. In step (S11) of FIG. 13, the three-phase output command $v_u^*$, $v_v^*$, $v_w^*$ corresponding to the three-phase output power is acquired.

Figure 9:
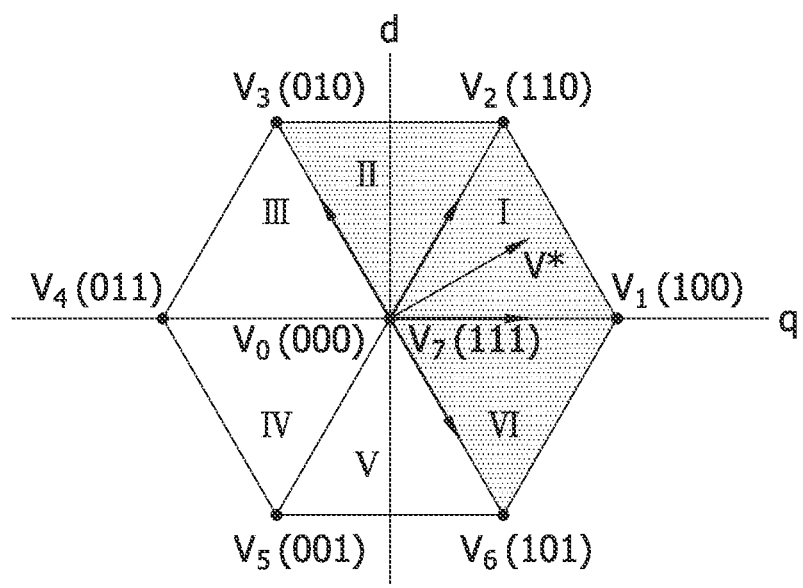
FIG. 9 is a space vector diagram composed of voltage vectors under AZSVPWM switching according to the present disclosure.

Afterward, refer to FIG. 8A and FIG. 8B, in step (S12), according to the three-phase output command $v_u^*$, $v_v^*$, $v_w^*$ and the control carrier ePWM, ePWM', the voltage phase angle θ corresponding to the three-phase output command $v_u^*$, $v_v^*$, $v_w^*$ is acquired. As shown in FIG. 8B, the control carrier includes a first triangle wave ePWM and a second triangle wave ePWM', and a phase difference between the first triangle wave ePWM and the second triangle wave ePWM' is π. Therefore, as shown in FIG. 9, the AZSVPWM control is executed to acquire the voltage phase angle θ corresponding to the three-phase output command $v_u^*$, $v_v^*$, $v_w^*$ located on a two-phase axis coordinate (i.e., d-q axis coordinate) according to the three-phase output command $v_u^*$, $v_v^*$, $v_w^*$, the first triangular wave ePWM, and the second triangular wave ePWM'.

Please refer to FIG. 8A, which shows a schematic waveform of the relationship between switch switching and a DC current in a switching cycle under traditional SVPWM switching. In comparison with the SVPWM switching technique shown in FIG. 8A, the AZSVPWM switching technique shown in FIG. 8B uses two carriers, i.e., one is the same carrier ePWM as in FIG. 8A, and the other is the reverse carrier ePWM'. The relationship between AZSVPWM switching and DC current is shown in FIG. 8B. In general, traditional power converters use electrolytic capacitors as DC-side capacitors $C_{dc}$. The larger the effective value of the DC-side capacitor current $i_{DC, inv, rms}$, the greater the heat that the DC-side capacitors $C_{dc}$ need to withstand, and therefore the larger the electrolytic capacitor is needed to avoid excessive temperature. Accordingly, by reducing the DC-side capacitor current $i_{DC, inv}$ can reduce the size of the electrolytic capacitor, thereby reducing the cost of the product.

Figure 6:
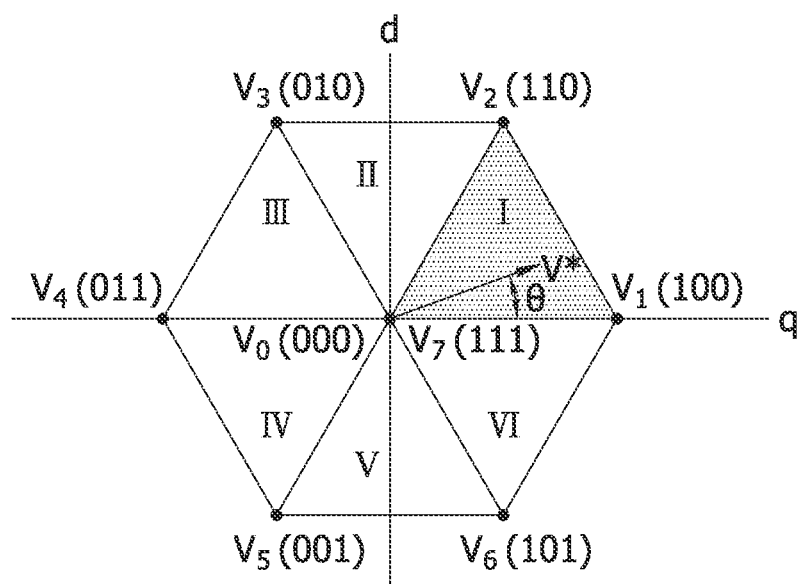
FIG. 6 is a space vector diagram composed of voltage vectors under the conventional SVPWM switching manner.

The technology proposed by the present disclosure is to reduce the current ripple of the DC-side capacitors $C_{dc}$ of the power converter by introducing the zero-sequence voltage in an appropriate interval when the power converter operates based on the AZSVPWM switching technology, thereby effectively increasing the stability and performance of the power converter in operation. Take the operation condition (the voltage interval $R_{vol}$ is in I and the current interval $R_{cur}$ is in I) as shown in FIG. 8B as an example: it can be analyzed that in a switching cycle, the composition of the voltage is $v_1$, $v_2$, $v_3$, $v_6$ and the zero vector. If explained with the vector diagram of FIG. 6, the output voltage command may be composed of the half-plane voltage vector under the AZSVPWM operation, as shown in FIG. 9.

Furthermore, a three-phase current value $i_u$, $i_v$, $i_w$ of the three-phase output power is acquired (S13). Afterward, in step (S14), the voltage phase angle θ and a positive/negative change of the three-phase current value $i_u$, $i_v$, $i_w$ is detected to decide that a zero-sequence voltage is a positive voltage, a zero voltage, or a negative voltage. Specifically, refer to FIG. 8B, FIG. 9, and Table 4, the control method further includes: determining one of the pluralities of phase intervals into which the voltage phase angle θ falls as the working voltage region. The controller 400 builds a table (or called a look-up table), and determines the voltage phase angle and the positive/negative change of the three-phase current value to determine whether the zero-sequence voltage is the positive voltage, the zero voltage, or the negative voltage by querying the table. In particular, the table includes a plurality of voltage intervals and a plurality of current intervals, and each voltage interval is corresponding to the plurality of current intervals, as shown in Table 4. Each voltage interval of the table correspondingly records a plurality of phase intervals. Each current interval of the table records the positive/negative change of the three-phase current value. The table records the zero-sequence voltage corresponding to each current interval in the different voltage intervals is the positive voltage, the zero voltage, or the negative voltage.

The detailed determination steps are as follows: determining that the voltage phase angle falls into one of the plurality of phase intervals; afterward, selecting correspondingly the voltage interval corresponding to one of the plurality of phase intervals in the table; afterward, receiving and determining the positive/negative change of the three-phase current value, and selecting the corresponding current interval in the table; finally, querying the table to decide that the zero-sequence voltage is the positive voltage, the zero voltage, or the negative voltage according to the selected voltage interval and the selected current interval.

In particular, the plurality of phase intervals include a first phase interval [0, π/3] (i.e., [0, 60°]), a second phase interval [π/3, 2π/3] (i.e., [60°, 120°]), a third phase interval [2π/3, π] (i.e., [120°, 180°]), a fourth phase interval [π, 4π/3] (i.e., [180°, 240°]), a fifth phase interval [4π/3, 5π/3] (i.e., [240°, 300°]), and a sixth phase interval [5π/3, 2π] (i.e., [300°, 360°]).

Specifically, refer to Table 3 and Table 5. When a U-phase current of the three-phase current value is positive, a V-phase current is negative, and a W-phase current is negative, the three-phase current value is recorded as a first current interval of the plurality of current intervals. When the U-phase current of the three-phase current value is positive, the V-phase current is positive, and the W-phase current is negative, the three-phase current value is recorded as a second current interval of the plurality of current intervals. When the U-phase current of the three-phase current value is negative, the V-phase current is positive, and the W-phase current is negative, the three-phase current value is recorded as a third current interval of the plurality of current intervals. When the U-phase current of the three-phase current value is negative, the V-phase current is positive, and the W-phase current is positive, the three-phase current value is recorded as a fourth current interval of the plurality of current intervals. When the U-phase current of the three-phase current value is negative, the V-phase current is negative, and the W-phase current is positive, the three-phase current value is recorded as a fifth current interval of the plurality of current intervals. When the U-phase current of the three-phase current value is positive, the V-phase current is negative, and the W-phase current is positive, the three-phase current value is recorded as a sixth current interval of the plurality of current intervals.

TABLE 4

| voltage intervals ($R_{vol}$) | current intervals ($R_{cur}$) | zero-sequence voltage ($v_z^*$) |
|---|---|---|
| I | I, IV | $v_{z1}^*(+)$ |
|  | II, V | $v_{z2}^*(-)$ |
|  | III, VI | 0 |
| II | II, V | $v_{z2}^*(-)$ |
|  | III, VI | $v_{z1}^*(+)$ |
|  | I, IV | 0 |
| III | III, VI | $v_{z1}^*(+)$ |
|  | I, IV | $v_{z2}^*(-)$ |
|  | II, V | 0 |
| IV | I, IV | $v_{z2}^*(-)$ |
|  | II, V | $v_{z1}^*(+)$ |
|  | III, VI | 0 |
| V | II, V | $v_{z1}^*(+)$ |
|  | III, VI | $v_{z2}^*(-)$ |
|  | I, IV | 0 |
| VI | III, VI | $v_{z2}^*(-)$ |
|  | I, IV | $v_{z1}^*(+)$ |
|  | II, V | 0 |

In Table 4, (+) represents the positive voltage, (−) represents the negative voltage, and 0 represents the zero voltage.

Figure 10A:
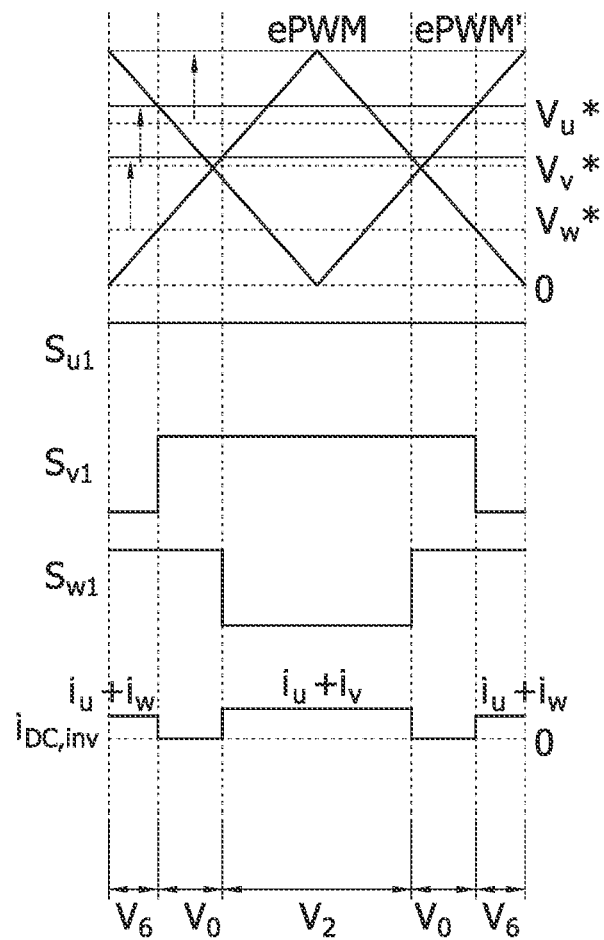
FIG. 10A is a schematic waveform of the relationship between switch switching and a DC current in a switching cycle when one voltage command is controlled to reach a peak value under the AZSVPWM switching according to the present disclosure.
Figure 11A:
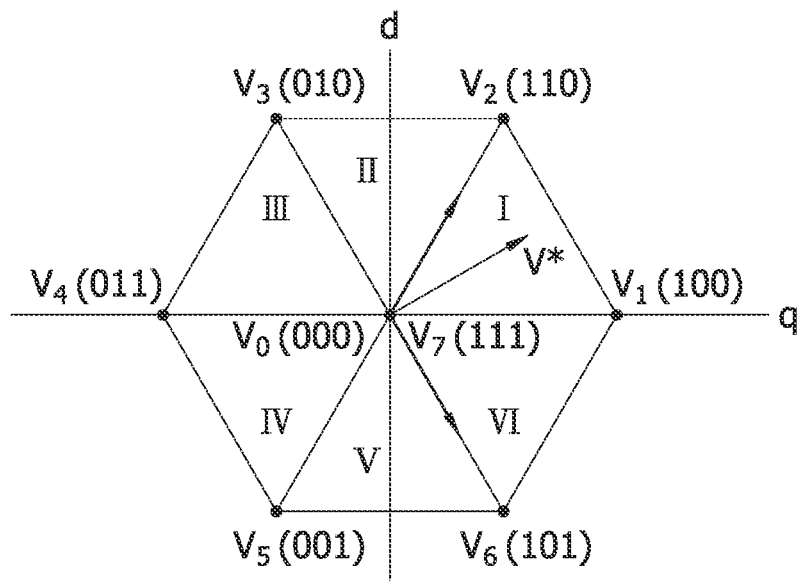
FIG. 11A is a space vector diagram composed of voltage vectors under the operation of FIG. 10A.

Preferably, in step (S14) of FIG. 13, when the zero-sequence voltage is decided to be the positive voltage, the control method further includes steps of: acquiring a peak value of the control carrier ePWM, ePWM' in a switching cycle; afterward, acquiring a maximum voltage command of the three-phase output command $v_u^*$, $v_v^*$, $v_w^*$; afterward, calculating a first voltage difference between the peak value and the maximum voltage command as a magnitude of the positive voltage of the zero-sequence voltage. As shown in FIG. 10A, which shows a schematic waveform of the relationship between switch switching and a DC current in a switching cycle when one voltage command is controlled to reach a peak value under the AZSVPWM switching according to the present disclosure. For example, after the voltage command is introduced into a zero-sequence voltage ($v_z^*=v_{z1}^*=\text{Tri-max}(v_u^*, v_v^*, v_w^*)$), the original maximum voltage command (i.e., $v_u^*$) is pushed to the top of the control carrier ePWM so that the switch of this phase fully is turned on during this switching cycle. In this condition, the output voltage command is only composed of $v_2$, $v_6$, and the zero vector, as shown in FIG. 11A.

Figure 10B:
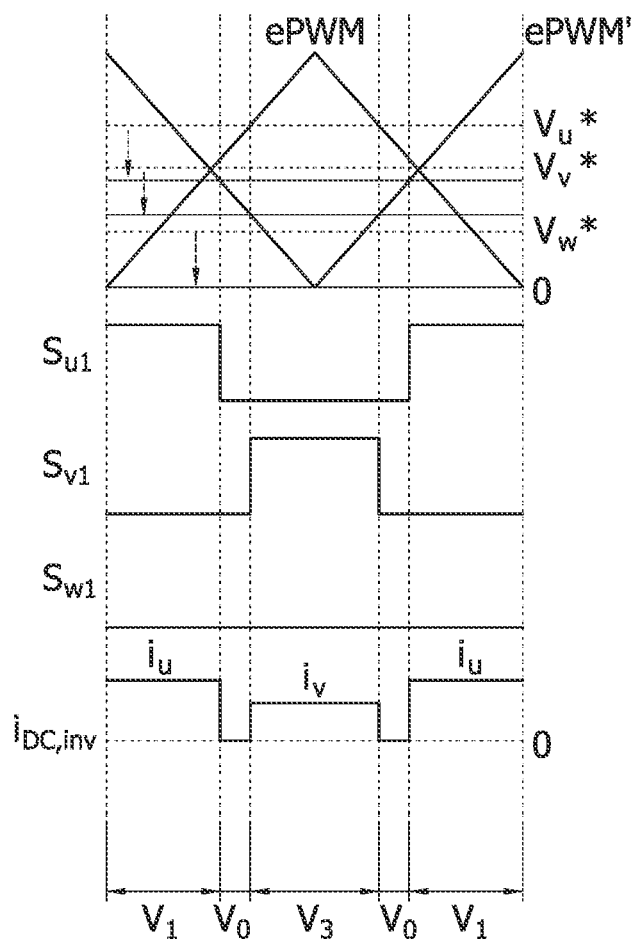
FIG. 10B is a schematic waveform of the relationship between switch switching and a DC current in a switching cycle when one voltage command is controlled to reach a valley value under the AZSVPWM switching according to the present disclosure.
Figure 11B:
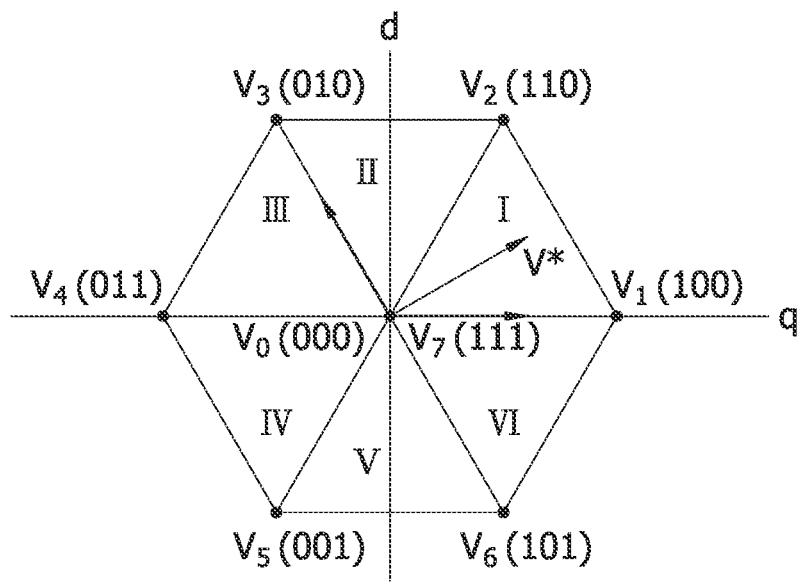
FIG. 11B is a space vector diagram composed of voltage vectors under the operation of FIG. 10B.

Preferably, in step (S14) of FIG. 13, when the zero-sequence voltage is decided to be the negative voltage, the control method further includes steps of: acquiring a valley value of the control carrier ePWM, ePWM' in a switching cycle; afterward, acquiring a minimum voltage command of the three-phase output command $v_u^*$, $v_v^*$, $v_w^*$; afterward, calculating a second voltage difference between the valley value and the minimum voltage command as a magnitude of the negative voltage of the zero-sequence voltage. As shown in FIG. 10B, which shows a schematic waveform of the relationship between switch switching and a DC current in a switching cycle when one voltage command is controlled to reach a valley value under the AZSVPWM switching according to the present disclosure. For example, after the voltage command is introduced into a zero-sequence voltage ($v_z^*=v_{z2}^*=-\min(v_u^*, v_v^*, v_w^*)$), the original minimum voltage command (i.e., $v_w^*$) is pulled to the bottom of the control carrier ePWM so that the switch of this phase fully is turned off during this switching cycle. In this condition, the output voltage command is only composed of $v_1$, $v_3$, and the zero vector, as shown in FIG. 11B.

Therefore, if the DC-side capacitor current $i_{DC, inv}$ wants to be reduced, it is necessary to reduce the voltage vector interval that generates the maximum DC current. Take the operation condition (the voltage interval $R_{vol}$ is in I and the current interval $R_{cur}$ is in I) as shown in FIG. 8B as an example: the maximum capacitor current is $i_u$ and the voltage vector is $v_1$ at this time. If the magnitude of the DC current wants to be reduced without affecting the output voltage, an appropriate zero-sequence voltage ($v_{z1}^*$) is introduced to eliminate $v_1$ to reduce the DC current by the AZSVPWM, as shown in FIG. 10A.

If the zero-sequence voltage $v_{z2}^*$ in FIG. 10A is introduced at this time, the original maximum DC current vector will become larger and cannot reduce the effective value (root-mean-square value) of the DC-side capacitor current $i_{DC, inv, rms}$. Similarly, if the operation condition at this time is that the current interval $R_{cur}$ is in II, an appropriate zero-sequence voltage ($v_{z2}^*$) is introduced to eliminate $v_2$ to reduce the DC current by the AZSVPWM, as shown in FIG. 10A. However, if the operation condition is that the current interval $R_{cur}$ is in III, that maximum current is $i_v$ as shown in Table 3. Under this operation condition, regardless of introducing $v_{z1}^*$ or $v_{z2}^*$ according to Table 1, the voltage command will be synthesized by voltage vectors with the (maximum) DC current of $i_v$, and therefore there is no any zero-sequence voltage needs to be introduced at this time, i.e., $v_z^*=0$.

Figure 12:
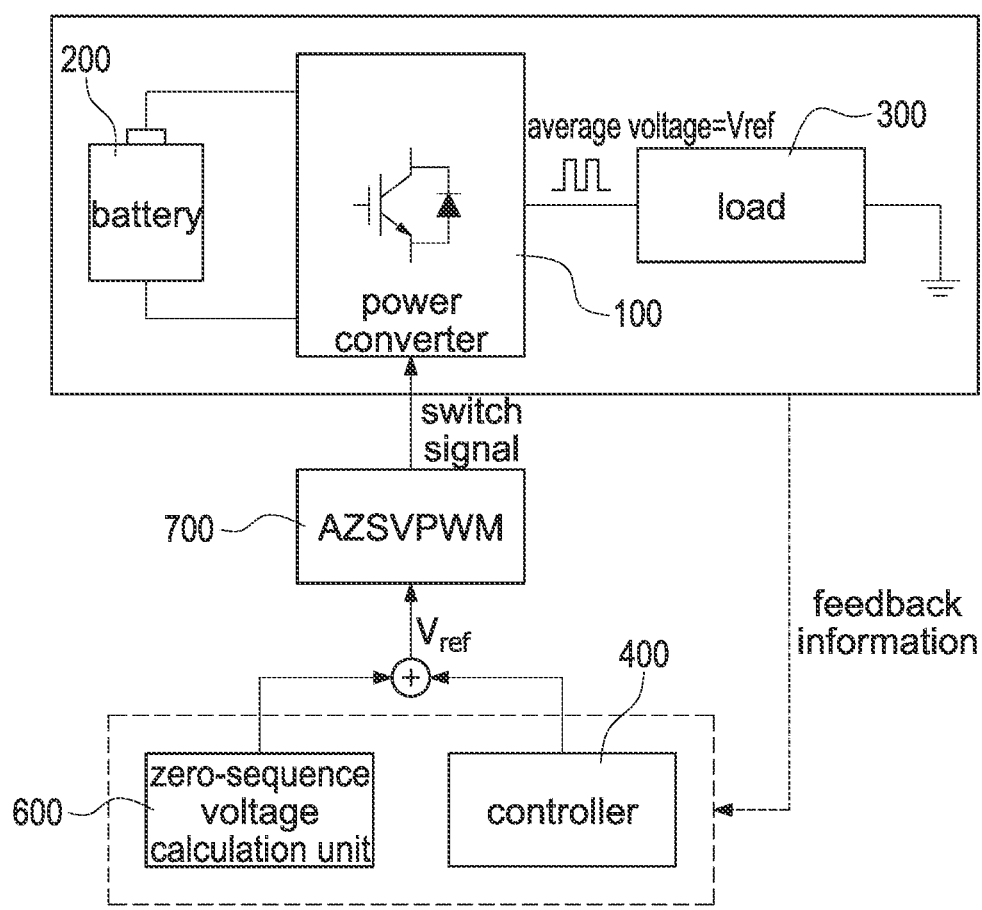
FIG. 12 is a block diagram of the system structure of the pulse width modulation applied to the power converter according to the present disclosure.

According to the above-mentioned analysis, if this method is extended to consider the all combinations of voltage intervals and current intervals, Table 4 sorts the combinations according to different voltage intervals and current intervals (Table 1 to Table 3) to realize that what kind of zero-sequence voltage may be introduced to effectively reduce the effective value (root-mean-square value) of the DC-side capacitor current $i_{DC, inv, rms}$. Therefore, this is the pulse width modulation that introduces local interval zero-sequence voltage proposed by the present disclosure, and the implemented system structure diagram is shown in FIG. 12. The controller 400 feeds back the current of the power converter, and determines the intervals between the current and the voltage command generated by itself. Also, according to Table 4, the zero-sequence voltage calculation unit 600 calculates the appropriate zero-sequence voltage to add to the voltage command, and finally achieves the low DC-side capacitor current through the implementation of AZSVPWM. The technology of the present disclosure is based on AZSVPWM that generates PWM signals through simple command and control carrier comparison, and does not require complicated calculations as described in the prior art to achieve the purpose of reducing the capacitor current.

In step (S15) of FIG. 13, the zero-sequence voltage and the three-phase output command $v_u^*$, $v_v^*$, $v_w^*$ are composed to acquire the three-phase output expected value. Afterward, the three-phase expected value with the control carrier are compared to acquire a turned-on time of each switch (S16) so as to adjust the three-phase output power by switching (converting) the input power according to the turned-on time of each switch (the upper arm switches $S_{u1}$, $S_{v1}$, $S_{w1}$ and the lower arm switches $S_{u2}$, $S_{v2}$, $S_{w2}$). In other words, the power converter 100 includes the DC-side capacitor $C_{dc}$ coupled to the switches ($S_{u1}$, $S_{v1}$, $S_{w1}$ and $S_{u2}$, $S_{v2}$, $S_{w2}$), and the controller 400 compares the three-phase expected value with the control carrier to acquire the turned-on time corresponding to each switch ($S_{u1}$, $S_{v1}$, $S_{w1}$ and $S_{u2}$, $S_{v2}$, $S_{w2}$) to reduce the current ripple of the DC-side capacitor $C_{dc}$. Accordingly, the control method of the power converter proposed by the present disclosure is based on the AZSVPWM technology, and the zero-sequence voltage is introduced in an appropriate interval to reduce the current ripple of the DC-side capacitor $C_{dc}$, thereby effectively increasing the stability and performance of the operation of the power converter.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of controlling a power converter, the power converter configured to convert an input power to generate a three-phase output power through a plurality of switches, the method comprising steps of:
   acquiring a three-phase output command corresponding to the three-phase output power,
   comparing the three-phase output command with a control carrier to acquire a voltage phase angle corresponding to the three-phase output command according to the comparison result, wherein the control carrier comprises a first triangle wave and a second triangle wave,
   acquiring a three-phase current value of the three-phase output power,
   detecting the voltage phase angle and a positive/negative change of the three-phase current value to determine that a zero-sequence voltage is a positive voltage, a zero voltage, or a negative voltage,
   composing the zero-sequence voltage and the three-phase output command to acquire a three-phase output expected value,
   comparing the three-phase output expected value with the control carrier to acquire a turned-on time of each switch of the plurality of switches,
   switching the input power to adjust the three-phase output power according to the turned-on time of each switch of the plurality of switches,
   building a lookup table by a controller,
   determining the voltage phase angle and the positive/negative change of the three-phase current value to query the lookup table to determine that the zero-sequence voltage is the positive voltage, the zero voltage, or the negative voltage,
   wherein the lookup table comprises a plurality of voltage intervals and a plurality of current intervals, and each voltage interval is corresponding to the plurality of current intervals, wherein
   each voltage interval of the lookup table correspondingly records a plurality of phase intervals,
   each current interval of the lookup table records the positive/negative change of the three-phase current value, and
   the lookup table records the zero-sequence voltage corresponding to each current interval in the plurality of voltage intervals as being the positive voltage, the zero voltage, or the negative voltage, and
   executing an Active Zero-State Space Vector Pulse-Width Modulation (AZSVPWM) control to acquire the voltage phase angle corresponding to the three-phase output command located on a two-phase axis coordinate according to the three-phase output command, the first triangle wave, and the second triangle wave.

2. The method as claimed in claim 1, further comprising steps of:
   determining that the voltage phase angle falls into one of the pluralities of phase intervals,
   selecting correspondingly the voltage interval corresponding to one of the pluralities of phase intervals in the lookup table,
   receiving and determining the positive/negative change of the three-phase current value, and selecting the corresponding current interval in the lookup table, and
   querying the lookup table to determine that the zero-sequence voltage is the positive voltage, the zero voltage, or the negative voltage according to the selected voltage interval and the selected current interval.

3. The method as claimed in claim 1, wherein the plurality of phase intervals comprises a first phase interval $[0, \pi/3]$, a second phase interval $[\pi/3, 2\pi/3]$, a third phase interval $[2\pi/3, \pi]$, a fourth phase interval $[\pi, 4\pi/3]$, a fifth phase interval $[4\pi/3, 5\pi/3]$, and a sixth phase interval $[5\pi/3, 2\pi]$.

4. The method as claimed in claim 1, further comprising steps of:
   recording the three-phase current value as a first current interval of the plurality of current intervals when a U-phase current of the three-phase current value is positive, a V-phase current is negative, and a W-phase current is negative,
   recording the three-phase current value as a second current interval of the plurality of current intervals when the U-phase current of the three-phase current value is positive, the V-phase current is positive, and the W-phase current is negative,
   recording the three-phase current value as a third current interval of the plurality of current intervals when the U-phase current of the three-phase current value is negative, the V-phase current is positive, and the W-phase current is negative,
   recording the three-phase current value as a fourth current interval of the plurality of current intervals when the U-phase current of the three-phase current value is negative, the V-phase current is positive, and the W-phase current is positive,
   recording the three-phase current value as a fifth current interval of the plurality of current intervals when the U-phase current of the three-phase current value is negative, the V-phase current is negative, and the W-phase current is positive, and
   recording the three-phase current value as a sixth current interval of the plurality of current intervals when the U-phase current of the three-phase current value is positive, the V-phase current is negative, and the W-phase current is positive.

5. The method as claimed in claim 1, wherein when the zero-sequence voltage is determined to be the positive voltage, the method further comprises steps of:
   acquiring a peak value of the control carrier in a switching cycle,
   acquiring a maximum voltage command of the three-phase output command, and
   calculating a first voltage difference between the peak value and the maximum voltage command as a magnitude of the positive voltage of the zero-sequence voltage.

6. The method as claimed in claim 1, wherein when the zero-sequence voltage is determined to be the negative voltage, the method further comprises steps of:
   acquiring a valley value of the control carrier in a switching cycle,
   acquiring a minimum voltage command of the three-phase output command, and calculating a second voltage difference between the valley value and the minimum voltage command as a magnitude of the negative voltage of the zero-sequence voltage.

7. The method as claimed in claim 1, wherein a phase difference between the first triangle wave and the second triangle wave is $\pi$.

8. The method as claimed in claim 1, wherein the power converter comprises a DC-side capacitor, and the DC-side capacitor is coupled to each of the plurality of switches, and the method further comprises a step of:
acquiring the turned-on time of each switch of the plurality of switches by comparing the three-phase output expected value with the control carrier to reduce a current ripple of the DC-side capacitor.

9. A power converter comprising:
a plurality of switches configured to convert an input power to generate a three-phase output power, and
a controller comprising a control carrier, wherein the controller is configured to acquire a three-phase output command corresponding to the three-phase output power, and acquire a voltage phase angle corresponding to the three-phase output command, wherein the control carrier comprises a first triangle wave and a second triangle wave,
wherein the controller is configured to detect a positive/negative change of a three-phase current value of the three-phase output power,
wherein the controller is configured to build a lookup table, and the lookup table comprises a plurality of voltage intervals and a plurality of current intervals, and each voltage interval is corresponding to the plurality of current intervals, wherein
each voltage interval of the lookup table correspondingly records a plurality of phase intervals,
each current interval of the lookup table records the positive/negative change of the three-phase current value, and
the lookup table records a zero-sequence voltage corresponding to each current interval in the plurality of voltage intervals as being a positive voltage, a zero voltage, or a negative voltage,
wherein the controller queries the lookup table to determine the voltage interval in which the voltage phase angle falls according to the voltage phase angle and the three-phase current value, and determines that the zero-sequence voltage is the positive voltage, the zero voltage, or the negative voltage according to the current interval corresponding to the positive/negative change of the three-phase current value,
wherein the controller composes the zero-sequence voltage and the three-phase output command to acquire a three-phase output expected value, and compares the three-phase output expected value with the control carrier to acquire a turned-on time of each switch of the plurality of switches,
wherein the controller executes an Active Zero-State Space Vector Pulse-Width Modulation (AZSVPWM) control to acquire the voltage phase angle corresponding to the three-phase output command located on a two-phase coordinate axis according to the three-phase output command, the first triangle wave, and the second triangle wave.

10. The power converter as claimed in claim 9, wherein the plurality of phase intervals comprises a first phase interval [0, $\pi/3$], a second phase interval [$\pi/3$, $2\pi/3$], a third phase interval [$2\pi/3$, $\pi$], a fourth phase interval [$\pi$, $4\pi/3$], a fifth phase interval [$4\pi/3$, $5\pi/3$], and a sixth phase interval [$5\pi/3$, $2\pi$].

11. The power converter as claimed in claim 9, wherein
when a U-phase current of the three-phase current value is positive, a V-phase current is negative, and a W-phase current is negative, the controller records the three-phase current value as a first current interval of the plurality of current intervals,
when the U-phase current of the three-phase current value is positive, the V-phase current is positive, and the W-phase current is negative, the controller records the three-phase current value as a second current interval of the plurality of current intervals,
when the U-phase current of the three-phase current value is negative, the V-phase current is positive, and the W-phase current is negative, the controller records the three-phase current value as a third current interval of the plurality of current intervals,
when the U-phase current of the three-phase current value is negative, the V-phase current is positive, and the W-phase current is positive, the controller records the three-phase current value as a fourth current interval of the plurality of current intervals,
when the U-phase current of the three-phase current value is negative, the V-phase current is negative, and the W-phase current is positive, the controller records the three-phase current value as a fifth current interval of the plurality of current intervals, and
when the U-phase current of the three-phase current value is positive, the V-phase current is negative, and the W-phase current is positive, the controller records the three-phase current value as a sixth current interval of the plurality of current intervals.

12. The power converter as claimed in claim 9, wherein when the controller determines that the zero-sequence voltage is the positive voltage, the controller further:
acquires a peak value of the control carrier in a switching cycle,
acquires a maximum voltage command of the three-phase output command, and
calculates a first voltage difference between the peak value and the maximum voltage command as a magnitude of the positive voltage of the zero-sequence voltage.

13. The power converter as claimed in claim 9, wherein when the controller determines that the zero-sequence voltage is the negative voltage, the controller further:
acquires a valley value of the control carrier in a switching cycle,
acquires a minimum voltage command of the three-phase output command, and
calculates a second voltage difference between the valley value and the minimum voltage command as a magnitude of the negative voltage of the zero-sequence voltage.

14. The power converter as claimed in claim 9, wherein a phase difference between the first triangle wave and the second triangle wave is $\pi$.

15. The power converter as claimed in claim 9, further comprising:
a DC-side capacitor coupled to each of the plurality of switches,
wherein the controller compares the three-phase output expected value with the control carrier to acquire the turned-on time corresponding to each switch of the plurality of switches to reduce a current ripple of the DC-side capacitor.

\* \* \* \* \*